United States Patent [19]
Bradley et al.

[11] Patent Number: 5,832,369
[45] Date of Patent: Nov. 3, 1998

[54] MICROWAVE RECEIVER CONFIGURED TO PROVIDE NON-REFERENCED DISTANCE MEASUREMENTS ALONG WITH SIGNAL MAGNITUDE MEASUREMENTS

[75] Inventors: Donald A. Bradley; Peter Kapetanic, both of Morgan Hill, Calif.

[73] Assignee: Wiltron Company, Morgan Hill, Calif.

[21] Appl. No.: 658,714

[22] Filed: Jun. 5, 1996

[51] Int. Cl.⁶ .................................................. H04B 17/00
[52] U.S. Cl. ..................... 455/67.6; 455/134; 455/139; 455/189.1; 455/214; 455/226.2; 455/209; 375/330; 329/304; 329/346
[58] Field of Search ................... 455/67.6, 139, 455/189.1, 205, 209, 214, 260, 226.2, 134; 375/322–327, 330, 375, 376; 329/304, 306, 307, 345, 346

[56] References Cited

U.S. PATENT DOCUMENTS

| | | | |
|---|---|---|---|
| 3,040,315 | 6/1962 | Kramer | 343/101 |
| 4,388,726 | 6/1983 | Dehaene | 375/56 |
| 4,599,743 | 7/1986 | Reed | 455/209 |
| 5,034,695 | 7/1991 | Owen | 455/208 |
| 5,280,637 | 1/1994 | Larosa et al. | 455/134 |
| 5,325,403 | 6/1994 | Siwiak et al. | 455/134 |
| 5,537,680 | 7/1996 | Bruno | 455/76.1 |

*Primary Examiner*—Donnie L. Crosland
*Attorney, Agent, or Firm*—Fliesler, Dubb, Meyer & Lovejoy

[57] ABSTRACT

A receiver configured to measure phase change ($\Delta\phi$) in a signal transmitted from a microwave signal source, such as a cell site for cellular telephones, the transmitted signal including a carrier signal ($F_1$) added to a modulation signal ($F_{MOD}$), the receiver providing the phase change measurement ($\Delta\phi$) without further reference to the modulation signal ($F_{MOD}$). Utilizing ($\Delta\phi$), distance from the transmitter can be calculated. The receiver includes one or more mixers for receiving the transmitted signal from the cell site and downconverting relative to an intermediate frequency signal ($F_{IF}$) to produce an IF mixed signal including a sum IF mixed signal ($F_{IF}+F_{MOD}$) and a difference IF mixed signal ($F_{IF}-F_{MOD}$). The receiver then further includes components to demodulate the IF mixed signal to provide the modulated signal ($F_{MOD}$) and the phase change measurement ($\Delta\phi$) with tracking of the intermediate frequency signal ($F_{IF}$). A relative signal magnitude can further be provided from measurement of the sum or difference IF mixed signals.

12 Claims, 3 Drawing Sheets

MICROWAVE RECEIVER CONFIGURED TO PROVIDE NON-REFERENCED DISTANCE MEASUREMENTS ALONG WITH SIGNAL MAGNITUDE MEASUREMENTS

BACKGROUND OF THE INVENTION

1. Field of the Invention

The present invention relates to measurement of distance from a microwave signal source. More particularly, the present invention relates to a receiver configured to measure phase change of a signal received from a microwave signal source in order to provide a measurement of distance from the microwave signal source, and a receiver configured to measure relative magnitude of a signal from a microwave signal source.

2. Description of the Related Art

FIG. 1 shows polar plots of typical electrical field patterns from cell sites 101–102, the cell sites 101–102 being used to transmit and receive signals from cellular telephones. As shown, each electric field pattern such as from cell site 101 includes lobes such as 110 and nulls such as 111. Nulls from two cell site patterns can combine to create a gap such as gap 120 as emphasized by hatched lines. Gaps between the electric field patterns, such as gap 120 prevent a cellular telephone user located at the gap 120 from transmitting and receiving. A goal in locating and maintaining cell sites is to assure no gaps in the electric field patterns occur between cell sites.

To determine if a gap occurs between cell sites, a technician typically uses an electric field strength measuring device, and travels between the cell sites measuring the electric field strength. By traveling on roads around the cell sites and knowing a location relative to the cell sites, polar electrical field plots, such as shown in FIG. 1 are made to enable a determination of where gaps exist.

To determine location relative to the cell site to develop such polar plots, technicians may use a device such as a global positioning system (GPS) receiver which utilizes signals from satellites to give a relative location within approximately 100 meters.

Because the GPS receiver gives only a relative location, a reference location must be initially identified. To determine distance from the cell site, the GPS user must, thus, first go to the cell site to make such an initial reference location identification before making further measurements relative to the cell site to create a polar plot.

SUMMARY OF THE INVENTION

The present invention enables a technician to make electrical field strength measurements and relative location measurements using a single device.

The present invention also enables relative location, or distance measurements to be made with greater accuracy than current commercially available GPS measurements which are accurate to only 100 meters.

The present invention further does not require a reference location, such as the location of a cell site, to be initially measured prior to measurements being made at other points to determine relative distance.

The present invention is a receiver which provides a measurement of phase change in a transmitted signal as transmitted from a signal source as well as relative magnitude of the signal. Utilizing the measurement of phase change, distance from the signal source can be calculated.

Also using the measurement of phase change, other desirable parameters can be calculated, such as time for an electrical signal to travel the distance from the signal source and group delay.

The present invention is a receiver configured to measure phase change ($\Delta\phi$) in a signal transmitted from a microwave signal source, the transmitted signal including a carrier signal ($F_1$) mixed with a modulation signal ($F_{MOD}$) provided from a first oscillator, the receiver providing the phase change measurement without further reference to the modulation signal ($F_{MOD}$) from the first oscillator.

The receiver of the present invention includes one or more mixers for receiving the transmitted signal and downconverting relative to an intermediate frequency (IF) signal ($F_{IF}$) to produce an IF mixed output signal including a sum IF mixed signal ($F_{IF}+F_{MOD}$) and a difference IF mixed signal ($F_{IF}-F_{MOD}$).

The receiver then further includes components to demodulate the IF mixed signal to provide the modulated signal ($F_{MOD}$) and the phase change measurement ($\Delta\phi$) with tracking of the intermediate frequency signal ($F_{IF}$). The demodulation components include:

a first filter receiving the IF mixed output and providing the sum IF mixed signal ($F_{IF}+F_{MOD}$) while filtering out the difference IF mixed signal ($F_{IF}-F_{MOD}$);

a second filter receiving the IF mixed output and providing the difference IF mixed signal ($F_{IF}-F_{MOD}$) while filtering out the sum IF mixed signal ($F_{IF}+F_{MOD}$);

a first mixer for mixing the first filter output with the second filter output;

a frequency divider receiving the first mixer output and dividing its frequency by two;

a second mixer for mixing the first filter output with a demodulating signal;

a third mixer for mixing the second filter output with the demodulating signal;

a first phase detector receiving the frequency divider output and the third mixer output and providing a voltage output indicating any phase difference; and a voltage controlled oscillator receiving the voltage output of the second phase detector, and having a center frequency approximately equal to the intermediate frequency signal ($F_{IF}$) as varied by the voltage output of the first phase detector to provide the demodulating signal; and a second phase detector receiving the second mixer output and the third mixer output and providing an output indicating any phase difference as the measurement of the phase change ($\Delta\phi$) in the transmitted signal.

Utilizing the phase change measurement ($\Delta\phi$), distance (D) can be calculated using the equation: $D = \Delta\phi \cdot 13.87962$. A relative signal magnitude measurement can be provided from measurement of the first or second filter outputs.

BRIEF DESCRIPTION OF THE DRAWINGS

Further details of the present invention are explained with the help of the attached drawings in which.

DETAILED DESCRIPTION

Figure 1:
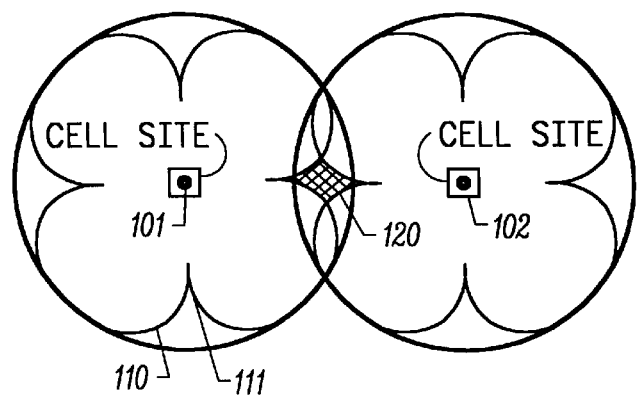
FIG. 1 shows polar plots of typical electrical field patterns from cell sites.
Figure 2:
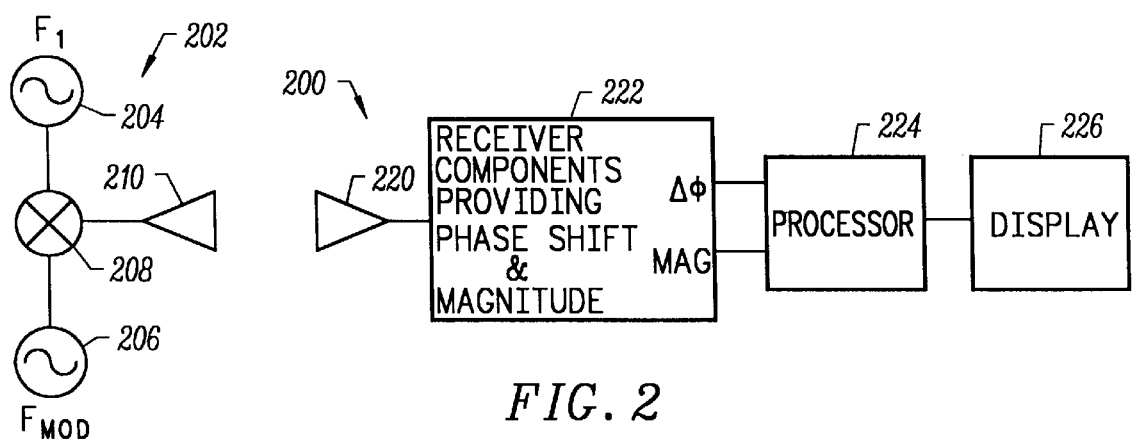
FIG. 2 shows a block diagram of components of a receiver of the present invention, along with components of a transmitter providing signals to the receiver.

FIG. 2 shows a block diagram of components of a receiver 200 of the present invention, along with components of a transmitter 202 providing signals to the receiver.

The transmitter 202 of FIG. 2 includes an oscillator 204 providing a carrier frequency signal ($F_1$). An additional oscillator 206 provides a modulation signal ($F_{MOD}$) which is mixed with the signal ($F_1$) in mixer 208 to provide a transmitted signal. The transmitted signal is transmitted through an antenna 210.

The transmitter can form part of a cell site for transmitting a signal to cellular telephones without affecting telephone transmission and reception. To prevent interference with cell phone communications, the carrier signal ($F_1$) can be the carrier for cellular telephone signals, while the modulation signal $F_{MOD}$ is provided at a frequency separate from telephone modulation signals for purposes of distance measurement when the cell site is being evaluated With $F_{MOD}$ being at a separate frequency from telephone modulation signals, the cell site can remain active while being evaluated by a technician and no interference with cell phone communications will occur.

The receiver 200 of FIG. 2 includes an antenna 220 for receiving the transmitted signal from antenna 210 of the transmitter. The transmitted signal is provided from the antenna 220 to receiver components 222 which provide both phase shift ($\Delta\phi$) and magnitude measurements to a processor 224. Using the phase shift measurement, and a known value of the frequency of the modulated signal ($F_{MOD}$) the processor 224 can calculate distance from the transmitter to the receiver, time required for a signal to travel from the transmitter to the receiver, and group delay as detailed below. The modulation signal frequency value can be stored in memory on board the processor 224, or provided from an external memory or user interface (not shown) to processor 224. Values from the processor 224 can then be provided to a display 226.

A technician can, thus, utilize the receiver at a location remote from the transmitter to measure distance from the transmitter as well as relative magnitude enabling polar electric field plots to be created as detailed previously. Also, the field plots can be created with a single measurement device unlike as discussed previously where a field strength meter was utilized in combination with a GPS receiver. Further, the distance measurement will be referenced to the transmitter without requiring the technician to travel to the transmitter as with a GPS receiver.

Distance can be calculated by the processor 224 from the phase measurement ($\Delta\phi$) as follows:

First, by combining equations (1) and (2) below, equation (3) can be derived.

$$\phi = 360 \cdot f \cdot t \qquad (1)$$

$$t = D \times 10^{-6}/299.8 \qquad (2)$$

$$\begin{aligned}\phi &= 360 \cdot f \cdot D \times 10^{-6}/299.8 \\ &= 1.200801 \times 10^{-6} \cdot f \cdot D\end{aligned} \qquad (3)$$

where $\phi$ represents phase in degrees, f represents frequency in Hertz, D represents distance in meters and t represents time in seconds.

Utilizing the transmitted signal, change in phase $\Delta\phi$ in the transmitted signal from the transmitter to the receiver can be derived as shown in equations (4)–(6) below.

$$\Delta\phi = \phi_2 - \phi_1 \qquad (4)$$

$$\Delta\phi = 1.20081 \times 10^{-6} \cdot D \cdot ((F_1 + F_{MOD}) - (F_1 - F_{MOD})) \qquad (5)$$

$$\Delta\phi = 1.200801 \times 10^{-6} \cdot D \cdot 2 \cdot F_{MOD} \qquad (6)$$

By setting the modulation frequency signal ($F_{MOD}$) to a known frequency, for example 30 KHz used in equations below, equation (6) becomes:

$$\Delta\phi = 0.07204806 \cdot D \qquad (7)$$

Then, by rearranging equation (7), D in meters with $F_{MOD}$ set to the known frequency (here 30 KHz) can be calculated as follows:

$$D = 13.87962 \cdot \Delta\phi \qquad (8)$$

Another useful parameter which can be calculated with $F_{MOD}$ set to the known frequency (here 30 KHz) is time for a signal to travel from the transmitter to the receiver. Such a time can be calculated using the relationship of equation (2) and equation (8) to provide equation (9).

$$t = 46.297 \times 10^{-9} \cdot \Delta\phi \qquad (9)$$

Another useful parameter which may also be provided is group delay, defined as $d\phi/d\omega$, which here translates to $\Delta\phi/\Delta F_1$. With $F_{MOD}$ set to a known frequency, $\Delta F_1$ can be determined to enable calculation of group delay. For example, with $F_{MOD}$ being 30 KHz, $\Delta F_1$ will be 60 KHz, and group delay can then be calculated from the phase shift measurement $\Delta\phi$. Although group delay of components in a cell site may not provide useful information, with a receiver of the present invention capable of measuring group delay and an RF source with appropriate $F_{MOD}$ provided on a test bench, group delay can be readily determined for a test device placed on the bench between the receiver and transmitter.

Figure 3:
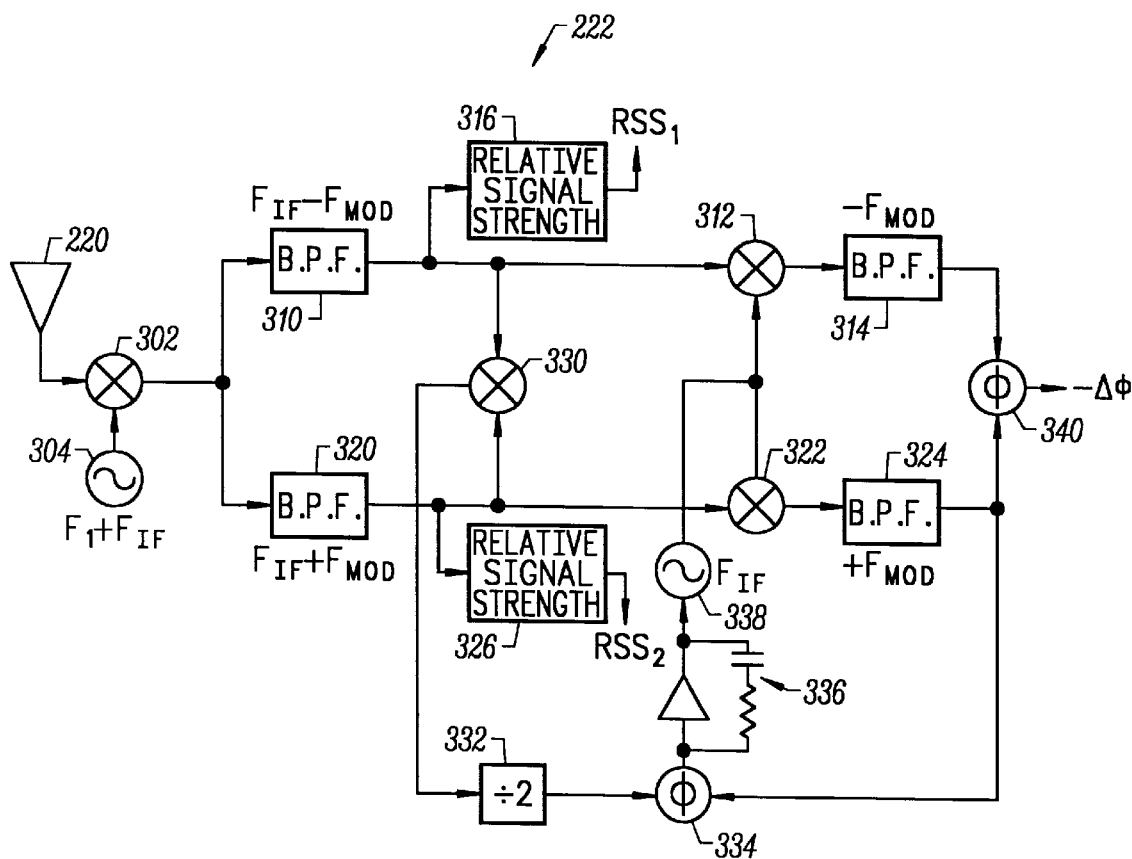
FIG. 3 shows specific circuitry for a receiver of the present invention.

FIG. 3 shows specific circuitry for receiver components 222 of FIG. 2 for a receiver of the present invention. The components 222 include a mixer 302 for receiving the transmitted signal from the antenna 220 and a signal from an oscillator 304 having a frequency of the carrier signal ($F_1$) added to the frequency of an IF signal ($F_{IF}$). The output the mixer 302, thus, provides an IF mixed output signal including a sum IF mixed signal ($F_{IF} + F_{MOD}$) having a frequency of the modulated signal ($F_{MOD}$) added to an IF signal ($F_{IF}$), and a difference IF mixed signal ($F_{IF} - F_{MOD}$) having a frequency of the modulated signal ($F_{MOD}$) subtracted from the IF signal ($F_{IF}$).

The IF mixed output signal from mixer 302 is provided to bandpass filters 310 and 320. Filter 310 has a passband region set to pass the sum IF mixed signal ($F_{IF} + F_{MOD}$), while filtering out the difference IF mixed signal ($F_{IF} - F_{MOD}$). Filter 320 has a passband region set to pass the difference IF mixed signal ($F_{IF} - F_{MOD}$) while filtering out the sum IF mixed signal ($F_{IF} + F_{MOD}$). The output of filter 310 is provided to inputs of mixers 312 and 330, while the output of filter 320 is provided to the inputs of mixers 322 and 330.

The output of mixer 330 is provided through a divide by two frequency divider 332 to a first input of a phase detector 334. The output of mixer 322 is provided through a bandpass filter 324 to a second input of the phase detector 334. The phase detector 334 provides a voltage indicating any difference between signals received at its inputs through an integrator 336 to a voltage controlled oscillator (VCO) 338. The VCO 338 has a center frequency approximately equal to the IF signal ($F_{IF}$) as varied by the voltage output of the phase detector 334 and provides an input to mixers 312 and 322.

Thus, with the signal from VCO 338, mixers 312 and 322 serve to demodulate the sum and difference signals ($F_{IF}+F_{MOD}$) and ($F_{IF}-F_{MOD}$) with tracking of the IF signal ($F_{IF}$) without further reference to oscillator 304. The output of mixer 312, thus, provides the inverse of the modulation signal ($-F_{MOD}$), while the output of mixer 322 provides the modulation signal ($F_{MOD}$).

The output of mixer 312 is provided through a bandpass filter 314 to a first input of an additional phase detector 340. Further, the output of mixer 322 is provided through filter 324 to the second input of the phase detector 340. Filter 314 has a bandpass region set to pass the inverse of the modulation signal ($-F_{MOD}$). Filter 324 has a bandpass region set to pass the modulation signal ($F_{MOD}$).

By measuring any phase difference between the modulation signal ($F_{MOD}$) and its inverse ($-F_{MOD}$), the phase detector 340, thus, provides an output indicating any phase change ($\Delta\phi$) occurring in the transmitted signal from the transmitter 202 to the receiver 200. Also, with the circuitry of FIG. 3, the receiver of the present invention provides the phase change measurement ($\Delta\phi$) from $F_{MOD}$ without further reference to the oscillator 206 which provides the signal $F_{MOD}$.

To provide signal magnitude, or amplitude, measurements, relative signal strength (RSS) measurement devices such as 316 and 326 can be connected to receive the output of respective filters 310 and 320. By knowing the magnitude of the signal transmitted from transmitter 202, either the $RSS_1$ signal of RSS measurement device 316, or the $RSS_2$ signal of the RSS measurement device 326 can be used to provide a signal magnitude measurement relative to the transmitted signal magnitude. By providing both the $RSS_1$ and $RSS_2$ signals, signal validity can be determined enabling elimination of multipath or other effects With a valid signal, the magnitude of the $RSS_1$ and $RSS_2$ signals will be equal. Unequal $RSS_1$ and $RSS_2$ signal magnitudes indicate an invalid signal due to multipath or other effects.

Figure 4:
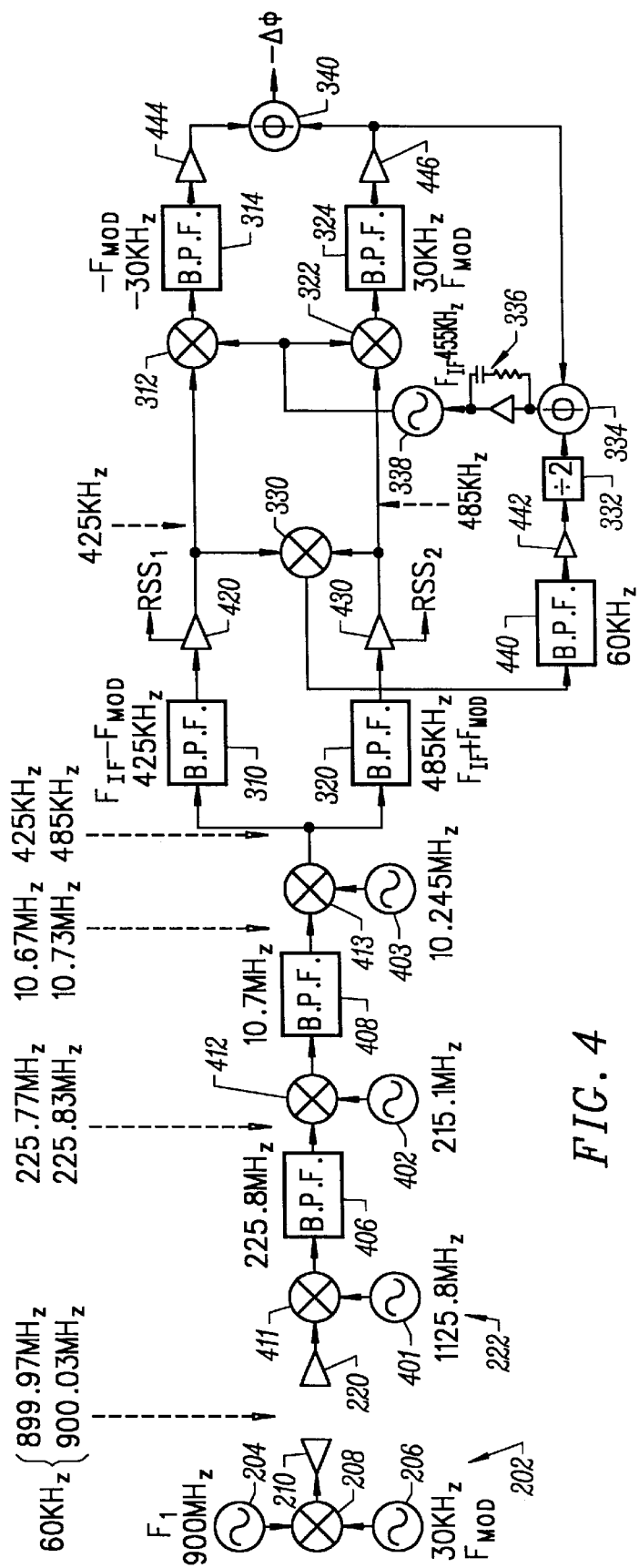
FIG. 4 shows modifications to the circuitry of FIG. 3 to enable improved signal isolation.

FIG. 4 shows modifications to the circuitry of FIG. 3 to enable improved signal isolation. Components carried over from FIG. 3 are labeled with similar reference numbers in FIG. 4. To illustrate operation, the transmitter 202 is shown providing a carrier frequency of 900 MHz from oscillator 204 and a modulation frequency, $F_{MOD}$, of 30 KHz from oscillator 206. The output of antenna 210, thus, provides signals at 900 MHz+30 KHz=899.97 MHz, and 900 MHz−30 KHz=900.03 MHz, the signals being separated by 60 KHz as shown above the dashed line in FIG. 5. The modulation frequency of 30 KHz is chosen to avoid cellular telephone frequencies which are typically separated by 60 KHz to enable testing of a cell site without disabling the cell site, as discussed previously. Although specific frequencies are shown in FIG. 4, these frequencies are for the purpose of illustrating operation of the circuitry, and other frequencies may be utilized.

To provide a sum IF mixed signal ($F_{IF}+F_{MOD}$) and a difference IF mixed signal ($F_{IF}-F_{MOD}$), similar to mixer 302 and oscillator 304 of FIG. 3; the receiver 222 of FIG. 4 includes oscillators 401–403, mixers 411–413 and band pass filters 406 and 408. The oscillators 401–403, mixers 411–143 and filters 406 and 408 provide multiple down conversions to enable images to be filtered out.

By using a single downconversion to mix the transmitted signals centered at 900 MHz with a signal centered at 900 MHz+455 KHz to provide a desired IF signal centered at 455 KHz, a signal centered at 455 MHz would be produced along with an image centered at a frequency of 900 MHz+2×455 KHz. The image, however would be difficult to filter out because the Q of the filter where (Q=center frequency/bandwidth) would be low resulting in a high cost filter to provide desired image removal. By downconverting two times, lower cost filters could be used to remove images. However, to achieve desirable filtering with commonly used filters, three downconversions are preferred.

In FIG. 4, to provide a first downconversion, mixer 411 receives the transmitted signal from antenna 220 and a signal from oscillator 401, shown here as 1125.8 MHz. Thus, the output of mixer 411 provides signals centered at 225.8 MHz and images centered at 1125.8 MHz+2×225.8 MHz=1577.4 MHz. The image centered at 1577.4 MHz is filtered out using bandpass filter 406, leaving only signals centered at 225.8 MHz. The output of filter 406 is, thus, signals having a frequency at the filter center frequency of 225.8 plus and minus the modulation frequency of 30 KHz, or signals at 225.77 MHz and 225.83 MHz as shown above the dashed line following filter 406.

A second downconversion is provided by mixer 412 which receives the signals centered at 225.8 MHz from filter 406 and a signal from oscillator 402, shown here as 215.1 MHz. Thus, the output of mixer 412 provides signals centered at 10.7 MHz, the signals being at 10.67 MHz and 10.73 MHz, as shown above the dashed line following filter 408, and an image which is filtered out using bandpass filter 408.

A third downconversion is provided by mixer 413 which receives the signals centered at 10.7 MHz from filter 408 and a signal from oscillator 403, shown here as 10.245 MHz. Thus, the output of mixer 413 provides the sum and difference mixed signals ($F_{IF}+F_{MOD}$), and ($F_{IF}-F_{MOD}$), which have frequencies here equal to 455 KHz, the desired $F_{IF}$ frequency, plus and minus 30 KHz, or signals at 425 KHz and 485 KHz as shown by the dashed line following mixer 413.

Filters 310 and 320 serve to filter out any images and to separate the sum and difference mixed signals, here 485 KHz and 425 KHz, as described previously with respect to FIG. 3. The output of filter 310 is provided through amplifier 420 to mixers 312 and 330, while the output of filter 320 is provided through amplifier 430 to mixers 322 and 330.

Amplifiers 420 and 430 provide relative signal strength indications $RSS_1$ and $RSS_2$, respectively, to function as the relative signal strength indication devices 316 and 326 of FIG. 3. An example of such amplifiers providing relative signal strength indications is the NE/SA604A logarithmic limiting amplifier made by Philips Semiconductors.

To provide improved isolation, a bandpass filter 440 is provided between the mixer 330 and frequency divider 332 The bandpass filter 440 is shown here with a center frequency of 60 KHz, which is the mixer 330 output frequency with inputs of 425 KHz and 485 KHz.

An amplifier 442 is provided between filter 440 and frequency divider 332 to maintain adequate signal levels. Similarly, amplifier 444 is provided between filter 314 and phase detector 340, and amplifier 446 is provided between filter 324 and phase detector 340 to assure adequate signal levels are maintained.

Although the invention has been described above with particularity, this was merely to teach one of ordinary skill in the art how to make and use the invention. Many modifications will fall within the scope of the invention, as that scope is defined by the claims which follow.

What is claimed is:

1. A receiver which provides a measurement of phase change in a transmitted signal as transmitted from a transmitter to the receiver, the transmitted signal including a carrier signal modulated with a modulation signal ($F_{MOD}$), the receiver comprising:

means for demodulating the transmitted signal to provide the modulated signal ($F_{MOD}$) and a negative of the modulated signal ($-F_{MOD}$) in frequency relative to a frequency of an intermediate frequency signal ($F_{IF}$); and means for measuring phase change between the modulated signal ($F_{MOD}$) and the negative of the modulated signal ($-F_{MOD}$) resulting from travel of the transmitted signal from the transmitter to the receiver.

2. The receiver of claim 1 wherein the means for demodulating comprises:

at least one IF mixer for receiving the transmitted signal and providing an IF mixed output, the IF mixed output including a sum IF mixed signal ($F_{IF}+F_{MOD}$) having a frequency of the modulated signal ($F_{MOD}$) added to the intermediate frequency signal ($F_{IF}$), and a difference IF mixed signal ($F_{IF}-F_{MOD}$) having a frequency of the negative modulated signal ($-F_{MOD}$) added to the intermediate frequency signal ($F_{IF}$);

a first mixer for receiving and mixing the sum IF mixed signal from the IF mixer with a demodulating signal to provide the modulated signal ($F_{MOD}$); and a second mixer for receiving and mixing the difference IF mixed signal from the IF mixer with a demodulating signal to provide the negative modulated signal ($-F_{MOD}$), and wherein the measuring means comprises:

a phase detector having inputs receiving the modulated signal ($F_{MOD}$) from the first mixer and the negative modulated signal from the second mixer, and providing an output indicating a phase difference between the modulated signal ($F_{MOD}$) and the negative modulated signal ($-F_{MOD}$).

3. The receiver of claim 2, wherein the means for demodulating further comprises:

a first filter receiving the IF mixed output and providing the sum IF mixed signal ($F_{IF}+F_{MOD}$) to the first mixer while filtering out the difference IF mixed signal ($F_{IF}-F_{MOD}$);

a second filter receiving the IF mixed output and providing the difference IF mixed signal ($F_{IF}-F_{MOD}$) to the second mixer as a second filter output while filtering out the sum IF mixed signal ($F_{IF}+F_{MOD}$);

a third mixer for receiving and mixing the first filter output with the second filter output to provide a third mixer output;

a frequency divider receiving the third mixer output and dividing its frequency to provide a frequency divider output;

a second phase detector receiving the frequency divider output and the negative modulated signal (-FMOD) from the second mixer and providing a voltage output indicating any phase difference; and a voltage controlled oscillator receiving the voltage output of the second phase detector, and having a center frequency approximately equal to the intermediate frequency signal ($F_{IF}$) as varied by the voltage output of the first phase detector to provide the demodulating signal to the first and second mixers.

4. The receiver of claim 1 further comprising:

a processor connected to receive the measurement of phase change from the means for measuring phase change and receiving a value for frequency of the modulated signal ($F_{MOD}$) and calculating therefrom a time for travel of the transmitted signal from the transmitter to the receiver; and a display receiving and displaying the time calculated by the processor.

5. The receiver of claim 3 further comprising:

an amplifier receiving the first filter output and providing an output for indicating relative signal strength of the modulation signal ($F_{MOD}$).

6. The receiver of claim 3 further comprising:

an amplifier receiving the second filter output and providing an output for indicating relative signal strength of the negative modulation signal ($-F_{MOD}$).

7. The receiver of claim 3 further comprising:

a first amplifier receiving the first filter output and providing an output for indicating relative signal strength of the modulation signal ($F_{MOD}$); and a second amplifier receiving the second filter output and providing an output for indicating relative signal strength of the negative modulation signal ($-F_{MOD}$).

8. The receiver of claim 1 further comprising:

a processor connected to receive the measurement of phase change from the means for measuring phase change and receiving a value for frequency of the modulation signal $F_{MOD}$ and calculating therefrom a distance from the transmitter to the receiver; and a display receiving and displaying the distance calculated by the processor.

9. The receiver of claim 1 further comprising:

a processor connected to receive the measurement of phase change from the means for measuring phase change and receiving a value for frequency of the modulated signal ($F_{MOD}$) and calculating therefrom group delay for the transmitted signal; and a display receiving and displaying the group delay calculated by the processor.

10. A receiver which provides a measurement of phase change in a transmitted signal as transmitted from a transmitter to the receiver, the transmitted signal including a carrier signal modulated with a modulation signal ($F_{MOD}$), the receiver comprising:

an IF mixer for receiving the transmitted signal and providing an IF mixed output including a sum IF mixed signal ($F_{IF}+F_{MOD}$) having a frequency of the modulated signal (FMOD) added to an intermediate frequency signal ($F_{IF}$) and a difference IF mixed signal ($F_{IF}-F_{MOD}$) having a frequency of the modulated signal ($F_{MOD}$) subtracted from the intermediate frequency signal ($F_{IF}$); and a first mixer for receiving the sum IF mixed signal from the IF mixer and mixing the sum IF mixed signal with a demodulating signal to provide the modulated signal (FMOD) which was added to the intermediate frequency signal as a first mixer output;

a second mixer for receiving the difference IF mixed signal from the IF mixer and mixing the sum IF mixed signal with a demodulating signal to provide the modulated signal (FMOD) which was subtracted from the from the intermediate frequency signal as a second mixer output; and a phase detector having inputs receiving the first mixer output and the second mixer output and providing an output voltage indicating any phase difference.

11. A receiver which provides a measurement of phase change in a transmitted signal as transmitted from a transmitter to the receiver, the transmitted signal including a carrier signal modulated with a modulation signal ($F_{MOD}$), the receiver comprising:

at least one IF mixer for receiving the transmitted signal and providing an IF mixed output, the IF mixed output including a sum IF mixed signal ($F_{IF}+F_{MOD}$) having a frequency of the modulated signal ($F_{MOD}$) added to an intermediate frequency signal ($F_{IF}$), and a difference IF mixed signal ($F_{IF}-F_{MOD}$) having a frequency of the modulated signal ($F_{MOD}$) subtracted from the intermediate frequency signal ($F_{IF}$); and a first filter receiving the IF mixed output and providing the sum IF mixed signal ($F_{IF}+F_{MOD}$) as a first filter output while filtering out the difference IF mixed signal ($F_{IF}-F_{MOD}$);

a second filter receiving the IF mixed output and providing the difference IF mixed signal ($F_{IF}-F_{MOD}$) as a second filter output while filtering out the sum IF mixed signal ($F_{IF}+F_{MOD}$);

a first mixer for receiving and mixing the first filter output with the second filter output to provide a first mixer output;

a frequency divider receiving the first mixer output and dividing its frequency to provide a frequency divider output;

a second mixer for receiving and mixing the first filter output with a demodulating signal to provide a second mixer output;

a third mixer for mixing the second filter output with the demodulating signal to provide a third mixer output;

a first phase detector receiving the frequency divider output and the third mixer output and providing a voltage output indicating any phase difference; and a voltage controlled oscillator receiving the voltage output of the second phase detector, and having a center frequency approximately equal to the intermediate frequency signal ($F_{IF}$) as varied by the voltage output of the first phase detector to provide the demodulating signal; and a second phase detector receiving the second mixer output and the third mixer output and providing an output indicating any phase difference as the measurement of the phase change in the transmitted signal.

12. The receiver of claim 11 further comprising:

a first amplifier receiving the first filter output and providing an output for indicating relative signal strength of the modulation signal ($F_{MOD}$); and a second amplifier receiving the second filter output and providing an output for indicating relative signal strength of the modulation signal ($F_{MOD}$).

* * * * *